United States Patent [19]

Moriguchi et al.

[11] 4,385,302
[45] May 24, 1983

[54] MULTICOLOR RECORDING APPARATUS

[75] Inventors: Haruhiko Moriguchi; Fujio Moriguchi; Takashi Ohmori, all of Ebina, Japan

[73] Assignee: Fuji Xerox Co., Ltd., Tokyo, Japan

[21] Appl. No.: 311,813

[22] Filed: Oct. 16, 1981

[30] Foreign Application Priority Data

Oct. 16, 1980 [JP] Japan .................. 55-143654
Dec. 4, 1980 [JP] Japan .................. 55-170292

[51] Int. Cl.³ ............................................. G01D 9/28
[52] U.S. Cl. ................................. 346/76 PH; 346/46
[58] Field of Search .................. 346/76 PH, 46, 76 R; 400/120

[56] References Cited

U.S. PATENT DOCUMENTS 3,984,809 10/1976 Dertouzos et al. ............ 346/76 PH
4,067,017 1/1978 Dertouzos et al. .................... 346/46
4,250,511 2/1981 Stein et al. ............................. 346/46

Primary Examiner—Joseph W. Hartary
Assistant Examiner—Derek Jennings
Attorney, Agent, or Firm—Sughrue, Mion, Zinn, Macpeak and Seas

[57] ABSTRACT

A plurality of thermal head assemblies can be arranged around a single backing roller to minimize the distance between recording stations. Synchronization marks recorded on the paper at a first station can be detected between recording stations to control the timing of image recording at the later stations.

6 Claims, 6 Drawing Figures

FIG. 3
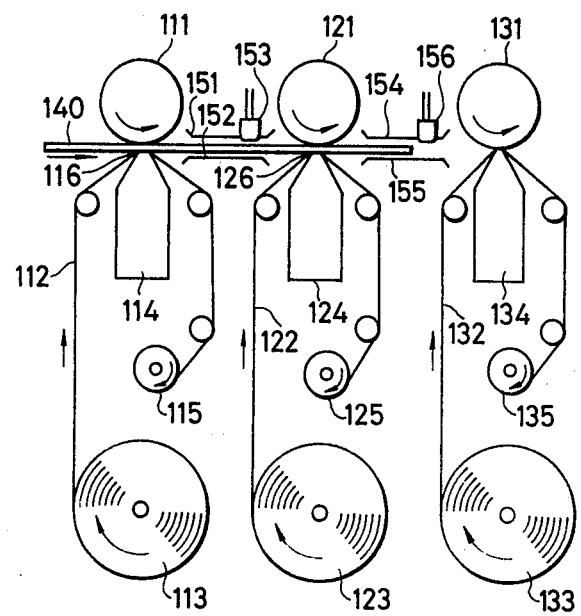
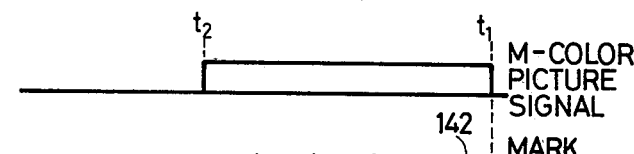
FIG. 4a — M-COLOR PICTURE SIGNAL
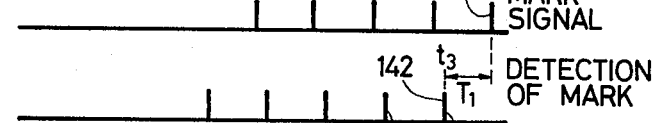
FIG. 4b — MARK SIGNAL
FIG. 4c — DETECTION OF MARK
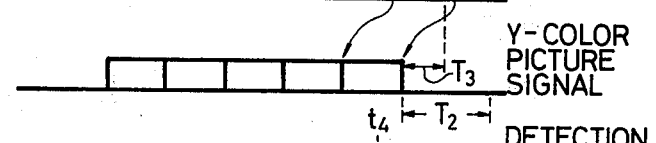
FIG. 4d — Y-COLOR PICTURE SIGNAL
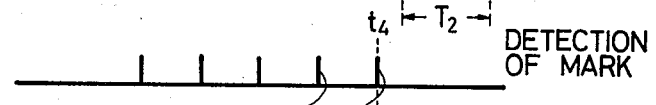
FIG. 4e — DETECTION OF MARK
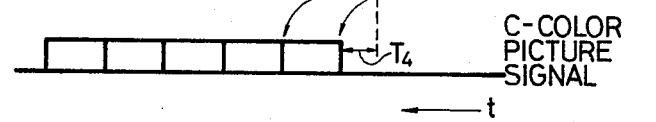
FIG. 4f — C-COLOR PICTURE SIGNAL

MULTICOLOR RECORDING APPARATUS

BACKGROUND OF THE INVENTION

This invention relates to a multicolor recording apparatus which employs ink donor sheets for recording information on ordinary paper. More particularly, it relates to a multicolor recording apparatus capable of restricting the color displacement in the picture image only locally.

It is known that it is possible to record information on ordinary paper by heat transfer if the paper is brought into contact with a hot-melt ink layer formed on one surface of an ink donor sheet, and the ink layer is selectively heated by a thermal head in accordance with pictorial information so that the ink may be melted and transferred to the recording paper.

It is also known that multicolor recording can be carried out in a thermal transfer recording system by preparing a plurality of types of ink donor sheets respectively coated with solid ink of different hues, and carrying out successive thermal transfer recording operations with these ink donor sheets onto a single sheet of recording paper.

In a multicolor recording apparatus using such a recording system, a plurality of recording stations for different colors are provided on a conveying passage for the recording sheet at predetermined intervals with each other. Upon recording at one station, the recording sheets are sent along the conveying passage to the next station, and picture signals of hues corresponding to each recording station are supplied to each of the respective recording stations to conduct multicolor recording. In this case, for the second or succeeding recording station disposed on the conveying passage, picture signals are delayed by a time period previously calculated depending on the running speed of the recording sheet and the distance from the previous recording station, so that the positions for the picture images recorded in each of the recording stations are aligned.

FIG. 1 shows a conventional two-color recording apparatus employing two different kinds of ink donor sheets. The apparatus comprises two recording stations, i.e., a p-color recording station 1 and a g-color recording station 2. The letters p and g designate two different colors, such as red and black, respectively.

The p-color recording station 1 comprises a p-colored sheet supply roll 11, a p-color thermal head 13 contacting the base or rear surface of a p-colored ink donor sheet 12 supplied from the roll 11, a p-color back roll 14 positioned opposite to the thermal head 13 for pressing ordinary paper 3 and the p-color ink donor sheet 12 into contact with the thermal head 13, and a p-color take-up roll 15 which collects the p-colored ink donor sheet 12 after the ink has been transferred therefrom onto the paper 3. Likewise, the g-color recording station 2 comprises a g-colored sheet supply roll 21 on which a g-colored ink donor sheet 22 is wound, a g-color thermal head 23, a g-color back roll 24, and a g-color take-up roll 25.

When the ordinary paper 3 is transported in the direction of an arrow A, and the p- and g-colored ink donor sheets 12 and 22 in the direction of an arrow B, p-colored pictorial information is recorded on the paper in the p-color recording station 1, and g-colored information is then recorded in the g-color recording station 2.

Each of the thermal heads 13 and 23 has a certain thickness when viewed in the direction of travel of the paper 3. The ink donor sheets passing about the thermal heads must be kept from contacting each other. Thus, it is necessary to provide a distance of at least about 50 mm between the heating resistors in the two thermal heads 13 and 23. This results in a requirement for a memory having a very large capacity for delaying the image signal to be fed to the g-color thermal head.

If, for example, paper of the A4 size conforming to the Japanese Industrial Standard (which has a width of 210 mm) is used as ordinary paper, the heating resistors in the thermal heads have an image element density of 8 dots/mm, 7.7 scanning lines per mm, and a distance of 50 mm from each other, the above-described two-color recording apparatus requires a memory of 646,800 bits ($210 \times 8 \times 50 \times 7.7$). A memory having three times as large a capacity is required for three-color recording, since the signals must again be delayed by twice as much between the first and third stations. This has been one of the factors which make this type of recording apparatus expensive.

Moreover, as it is impossible to position the thermal heads sufficiently close to each other, paper is very likely to slacken between the heads, resulting in a substantial possibility of colored images being recorded in the wrong positions at subsequent stations, thereby detracting from the image quality.

SUMMARY OF THE INVENTION

In view of these circumstances, it is an object of this invention to provide a multicolor recording apparatus which permits positioning of the thermal heads closer to each other. According to this invention, the aforesaid object is attained by positioning a plurality of thermal heads radially about a single back roll.

It is a further object of this invention to provide a multicolor recording apparatus capable of restricting the color displacement in the picture images to only local regions, if it occurs due to slack in the recording sheet or the like. This further object is achieved by recording a plurality of marks at predetermined intervals along the subscanning direction on a recording sheet in the first recording station among a plurality of recording stations for conducting multicolor recording. Then, these marks are detected at or near the remaining recording stations so that the recording timing may be conformed in these recording stations.

BRIEF DESCRIPTION OF THE DRAWINGS

The preferred embodiments of this invention will now be described in detail with reference to the accompanying drawings, in which:

FIG. 3 is a side view illustrating a part of a multicolor recording apparatus according to a second embodiment of this invention;

FIGS. 4a–4f are explanatory view for the positioning of the images in FIG. 3;

DETAILED DESCRIPTION OF THE PREFERRED EMBODIMENTS

Figure 1:
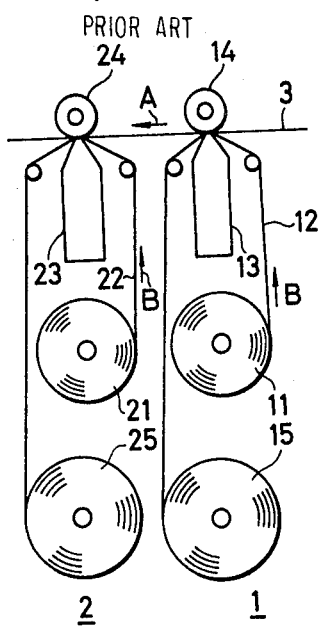
FIG. 1 is a view showing the essential arrangement of a heat transfer type multicolor recording apparatus known in the art.
Figure 2:
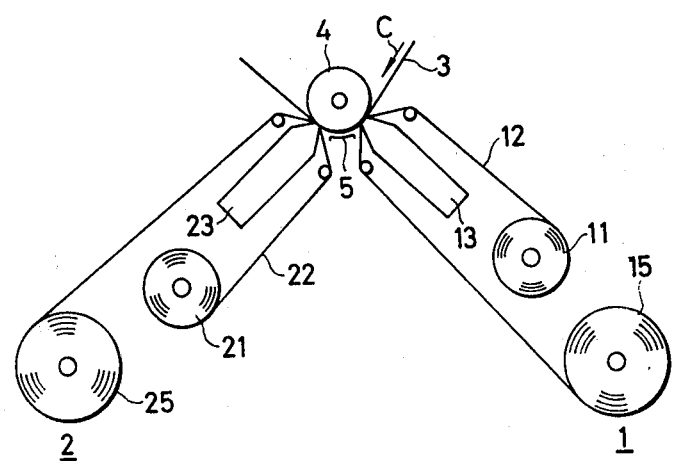
FIG. 2 is a view showing the essential arrangement of a multicolor recording apparatus according to a first embodiment of this invention.

FIG. 2 shows a two-color recording apparatus according to a first embodiment of this invention. Like numerals are used to designate like parts in both FIGS. 1 and 2. The apparatus shown in FIG. 2 comprises a p-color recording station 1 and a g-color recording station 2 which are positioned radially about a common back roll 4 at an angle of about 90° to each other.

If the recording operation is started, ordinary paper 3 begins to travel in the direction of an arrow C at a speed which is equal to the peripheral velocity of the back roll 4. When the leading edge of the paper 3 has arrived in the vicinity of the p-color thermal head 13, a p-colored ink donor sheet 12 begins to travel. The paper 3 is sandwiched between the back roll 4 and the p-colored ink donor sheet 12, and passes above the heating resistor in the p-color thermal head 13, whereby p-colored information is recorded on the paper by heat transfer.

The leading edge of the paper 3 then separates from the p-colored ink donor sheet 12, travels along a paper guide 5, and arrives in the vicinity of a g-colored thermal head 23. A g-colored ink donor sheet 22 begins to travel, and when the paper 3 travels above the g-color thermal head 23, a g-colored image is recorded on the paper in such a fashion that it may be properly positioned relative to the p-colored image.

If the back roll 4 has a diameter of 30 mm, the heating resistors in the two thermal heads 13 and 23 have a distance of about 24 mm from each other along the periphery of the back roll 4. Accordingly, it is sufficient to provide a memory capacity which is a half of what is required for the conventional recording apparatus as hereinbefore described.

Since a plurality of thermal heads are positioned radially about a single back roll, this invention eliminates the improper positioning of differently colored images which is likely to arise from any difference in diameter between back rolls in a conventional recording apparatus. This invention further improves any such improper positioning of differently colored images, since the closer positioning of the thermal heads to each other minimizes the possibility of slackening of the recording paper.

Although this embodiment as hereinabove described is directed to a two-color recording apparatus, it should be easily understood that it is equally applicable to a three-or more-color recording apparatus. A third thermal head could be arranged around the roll 4 in FIG. 2, or in the case of a four-color apparatus a second back roll could be used with the first and second and the third and fourth being closely spaced as in FIG. 2 while the second and third are conventionally spaced. It should also be understood that angles of other than 90° between thermal heads could be used.

A second embodiment of this invention will now be described with reference to FIGS. 3-7. FIG. 3 shows a multi-color recording apparatus having three recording stations. In this multicolor recording apparatus, a first recording station for conducting recording with magenta color comprises a first back roll 111, an M-color ink donor sheet 112 wherein magenta color ink is coated on a substrate, a first feed roll 113 for feeding the ink donor sheet 112, a first thermal recording head 114 that contacts the first back roll 111 by way of the ink donor sheet 112 thus fed, and a first take-up roll 115 for recovering the M-color ink donor sheet 112 after the image transfer. A second recording station for conducting recording with yellow color comprises a second back roll 121, an a Y-color ink donor sheet 122 wherein yellow ink is coated on a substrate, a second feed roll 123 for feeding the ink donor sheet 122, a second thermal recording head 124 that contacts the second back roll 121 by way of the thus supplied ink donor sheet 122, and a second take-up roll 125 for recovering the Y-color ink donor sheet 122 after the image transfer. Further, a third recording station for conducting recording with cyan color comprises a third back roll 131, a C-color ink donor sheet 132 wherein cyan color ink is coated on a substrate, a third feed roll 133 for feeding the ink donor sheets 132, a third thermal recording head 134 that contacts the third back roll 131 by way of the thus supplied C-color ink donor sheet 132, and a third take-up roll 135 for recovering the ink donor sheet 132 after the image transfer. A pair of paper guides 151, 152 are disposed for guiding the running of the copy paper 140 through the paper conveying passage between the first recording station and the second recording station, and a first mark sensor 153 is mounted near the second back roll 121 of the paper guide 151. In the same way, a pair of paper guides 154, 155 for guiding the running of the paper 140 are provided in the recording sheet conveying passage between the second recording station and the third recording station, and a second mark sensor 156 is mounted near the third back roll 131 of the paper guide 154.

Now, when a start button (not shown) is pushed, the recording operation for the multicolor recording apparatus is started. As is well-known, a multicolor recording printer includes a clock generator (not shown) for generating various reference signals. The clock generator provides step signals for conveying paper from the time the start button is pushed. The step signals are supplied by way of a pulse motor driving circuit (not shown) to a pulse motor (also not shown). Thus, a feed roll (not shown) is driven to send the recording paper 140 to the first recording station.

At this time point, the clock generator provides step signals for running the ink donor sheets. The step signals are supplied by way of another pulse motor driving circuit (not shown) to another pulse motor (also not shown) which causes the donor sheet to run. Thus, the back rolls 111, 121, 131, the feed rolls 113, 123, 133 and the take-up rolls 115, 125, 135 in each of the recording stations start to rotate at equal speeds in the direction of their respective arrows, whereby the ink donor sheets 112, 122, 132 are caused to run in the direction of the arrows under constant tension. As a result, once the recording paper 140 is sent out to a position where the leading edge arrives at the contact portion (transfer section) 116 between the first back roll 111 and the ink donor sheet 112, the paper is thereafter conveyed in the direction of the arrows along the conveying passage by the back rolls 111, 121, 131 in each of the recording stations.

Referring to FIGS. 4a-4f, at the time point t1 at which the leading edge of the paper 140 arrives at the transfer station 116 at the first recording station, a word processor (not shown) begins to supply picture signals for magenta color recording (hereinafter referred to as "M-color picture signals"). The M-color picture signals are fed to a thermal recording head driving circuit (not shown) for recording magenta color, to thereby drive the first thermal recording head 114. As a result, thermal transfer recording is started from the time point t1 by the M-color picture signals as shown in FIG. 4a.

The clock generator referred to above generates mark signals at predetermined intervals over a time period from the time point t1 to the time point t2 at which magenta color recording is completed (FIG. 4b). These mark signals are supplied to heat generation elements arranged near the starting point for the main scanning of the first thermal recording head 114. As a result, picture information 141 is recorded on the paper 140, and dot-like marks 142 are recorded successively at the blank portion on the side end of the paper as shown in FIG. 3. These marks 142 are utilized for the registration of the recording positions in the second recording station and the third recording station.

Figure 6:
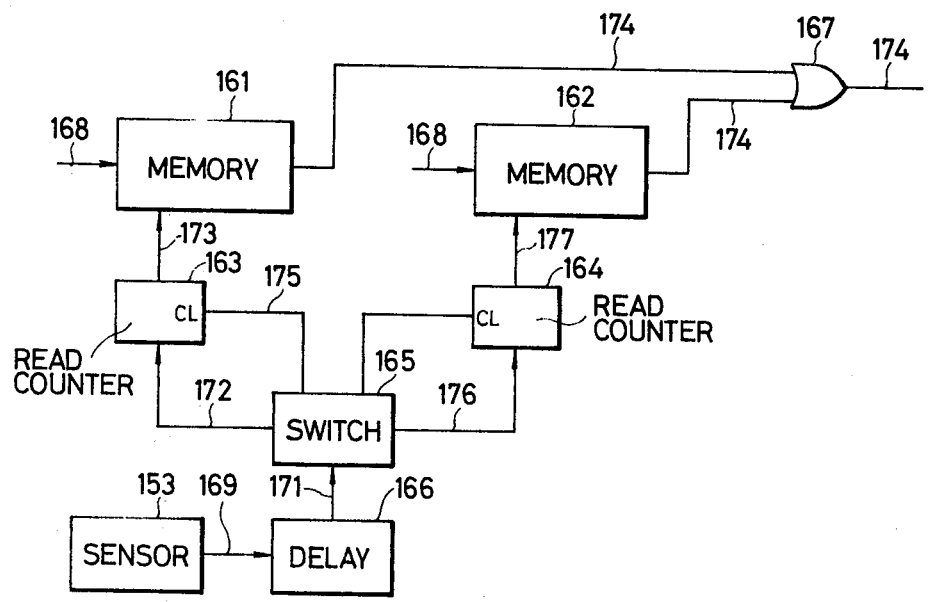
FIG. 6 is a block diagram of the control circuit for the registration of the recording position in the second recording station in the embodiment of FIG. 3.

FIG. 6 shows a control circuit for the registration of the recording position in the second recording station. The control circuit comprises first and second picture signal memories 161, 162, first and second read counters 163, 164 for reading out picture signals for Y-color recording (hereinafter referred to as "Y-color picture signals") from these picture signal memories, a turn-over switch 165 for controlling these read counters, a delay circuit 166 for operating the turn-over switch 165 by delaying the output of the first mark sensor 153, and an OR circuit 167 for feeding the picture signals to a driving circuit associated with the second thermal recording head 124.

During recording at the second station, the Y-color picture signals 168 fed from the word processor to the multicolor recording apparatus are written into the first and the second picture signal memories 161, 162 alternating with every interval between mark signals, the writing beginning with the first picture signal memory 161. Picture signals are written into the first and second picture signal memories 161, 162 one after another in succession, with data being written into one memory while being read from the other in a "ping-pong" manner well known in the art.

When the paper 140 is conveyed to the second transfer station 126 of the second recording station, the first mark sensor 153 detects a mark 142 (FIG. 4c). The elapsed time T1 from the time point t1 at which the first mark has been recorded to the time point t3 at which the mark is detected by the first mark sensor 153 is a value which varies depending on various conditions such as the distance between the first thermal recording head 114 and the first mark sensor 153, the conveying speed for the paper 140, slackness in the paper 140, or the like. The delay 166 delays the mark detection signal by an amount T3 which will elapse between the detection of the mark and its arrival at the next recording head. This time can either be predetermined or, with simple hardwave, means in the delay 166 could calculate the time T2 required for the mark to pass from the first to second recording heads, based on the detected time T1, and T3 could be obtained by merely subtracting T1 from T2. Shortly, after or simultaneously with recording at the first station, the Y data corresponding to the M data recorded between the first and second mark signals at the first station is written into the first memory 161 while the Y data corresponding to the M data recorded at the first station between the second the third marks is written into memory 162.

Consequently, when the detection signals 169 for the mark 142 are successively outputted from the first mark sensor 153 to the delay counter 166, the delay counter 166 successively supplies the delayed detection signals 171 to the turn-over switch 165. When the first detection signal 171 is supplied, the turn-over switch 165 outputs the detection signal as a start signal 172 to the first read counter 163. Thus, read signals 173 are supplied from the first read counter 163 to the first picture signal memory 161, and the Y-color picture signals 174 are fed from the first picture signal memory 161 to the head driving circuit by way of the OR circuit 167.

When the delay counter 166 generates a second detection signal 134 at a subsequent time point, the turn-over switch 165, receiving the signal, supplies a clear signal 175 to the clear terminal CL of the first read counter 163 to clear the counted value. Simultaneously therewith, the turn-over switch 165 supplies a start signal 176 to the second read counter 164. This disconnects the read signals 173 and simultaneously starts the supply of read signals 177 from the second read counter 164 to the second picture signal memory 162. As a result, Y-color picture signals 174 whose position is registered are now fed from the second picture signal memory 162 to the head driving circuit by way of the OR circuit 167.

In the same manner, Y-color picture signals 174 whose position is adjusted are hereinafter issued alternately from the first and second picture signal memories 161, 162. While data is being read from one memory, the Y data corresponding to the next mark interval is being written into the other memory. A printing head driving circuit drives the second thermal recording head 124 based on these Y-color picture signals 174. As a result, recording is performed on the paper 140 with Y-color signals in which color displacement in the picture is compensated at every mark 142.

A control circuit such as that shown in FIG. 6 is also provided for the third recording station for conducting cyan color recording. Accordingly, when the second mark sensor 156 detects the mark 142 at the time point t4 subsequent to the time point t3 (FIG. 4e), a delay circuit similar to circuit 166 provides a delay time T4. Then, the control circuit generates picture signals for recording cyan color (hereinafter referred to as "C-color picture signals") with a delay time of T4 from every mark detection signal (FIG. 4f), and the third thermal recording head 135 is driven based on the C-color signals alternately outputted from two picture signals memories. As a result, recording is performed on the paper 140 with the C-color picture signals in which color displacement in the picture images is compensated at every mark 142.

As described above, according to this embodiment of the invention, the color displacement in the picture images can be compensated in the multicolor recording apparatus without increasing the burden on the host system such as a word processor. Although the embodiment as illustrated in FIG. 3 will substantially compensate for color displacement problems due to slack in the recording paper, there is still some possibility of slack occurring between the mark sensors and the following back roll. For greater accuracy, the axial dimension of the back rollers could be made less than the width of the recording paper so that the mark sensors could be placed alongside the back rolls at precisely the transfer station, i.e., at the location of the thermal head. Further, although this second embodiment of the invention has been described for multicolor recording using three colors, it will be apparent that it can also be applied to multicolor recording for any two or more colors. It should also be appreciated that the features of the two embodiments could be combined, e.g. the guide 5 in FIG. 2 could include a mark sensor similar to 153 or 154.

Figure 5:
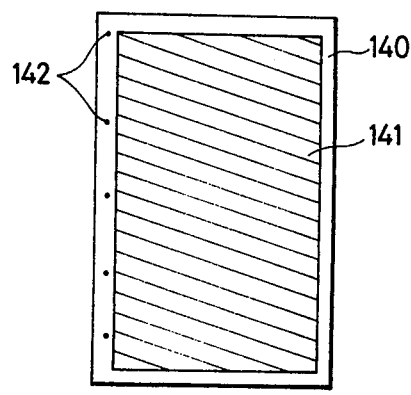
FIG. 5 is an explanatory view for the recording state of the paper in FIG. 3.

Thus, with a simple arrangement of FIG. 2, offset can be reduced, and with the use of synchronizing marks and the simple circuit of FIG. 5, offset can be substantially eliminated. The thermal heads used in the embodiment of FIG. 3 can be conventioned, since there are extra thermal heating elements on conventioned heads which are normally not used for printing because they are in the margin outside of the normal printing field 141.

It should also be realized that a variety of simple memory configurations could be used without departing from the spirit and scope of the invention. For instance, the Y data could all be written into memories 161 and 162 prior to any read out thereof, with the first mark interval data being stored in the first memory 161 at addresses 1 through n, the third interval data at addresses (n+1) through 2n, etc., and the second interval data stored in the second memory 162 at addresses 1 through n, the fourth interval data at addresses (n+1) through 2n, etc. During subsequent recording at the second station, the counters 163 and 164 would not be reset but would merely pick up where they left off at the end of a previous read-out. This method of memory operation, however, may be disadvantageous in that it would require the two memories 161 and 162 be large enough to collectively store the data of a particular color for an entire image.

What is claimed is:

1. A multicolor recording apparatus of the type wherein a sheet of recording paper in contact with an ink-bearing surface of a first color ink donor sheet is passed between a back roll and a first thermal element which selectively heats said first donor sheet to transfer a first color ink to said paper, and said sheet is subsequently passed between a back roll and at least a second thermal element together with a second ink donor sheet whereby a second color ink is transferred to said paper to form a multicolor image, the improvement characterized in that the same back roll serves both of said first and second thermal elements, said thermal elements being circumferentially displaced around said same back roll.

2. A multicolor recording apparatus as defined in claim 1, further comprising a guide member disposed adjacent said same back roll between said first and second thermal elements, said recording paper sheet passing between said first thermal head to said second thermal head.

3. A multicolor recording apparatus of the type wherein a single sheet of recording paper is passed through a plurality of recording stations, each of said recording stations recording a different color image portion on said single sheet by selectively applying heat to different colored ink donor films in contact with said sheet at each recording station, each of said recording stations including a thermal head assembly having a plurality of data heat generating elements for selectively applying heat in accordance with image data, the improvement characterized in that said thermal head assembly at a first one of said plurality recording stations records synchronizing marks on said recording paper at predetermined intervals, said improvement further comprising:

detection means prior to at least a second of said plurality of recording stations for detecting said synchronization marks; and control means for controlling the timing of data recorded at said second recording station in accordance with said detected synchronization marks.

4. A multicolor recording apparatus as defined in claim 3, wherein said first and second recording stations record images of first and second colors, respectively, wherein said detection means generates a detection signal corresponding to each detected synchronization mark, and wherein said control means comprises:

a first memory for storing said second color data corresponding substantially to first color data recorded at said first station between first and second synchronizing marks;

a second memory for storing second color data corresponding substantially to first color data recorded at said first recording station between second and third marks; and means for reading data out of said first memory to said thermal head assembly of said second recording station in response to the detection of said first synchronization mark and for reading data out of said second memory to said thermal head assembly of said second recording station in response to detection of said second synchronization mark.

5. A multicolor recording apparatus as defined in claim 4, wherein second color data corresponding to first color data recorded at said first recording station between any nth and (n+1)th synchronization pulses is written into one of said first and second memories while second color data corresponding to first color data recorded at said first recording station between (n−1)th and nth synchronization pulses is being read out of the other of said first and second memories.

6. A multicolor recording apparatus as defined in either of claims 4 or 5, wherein said means for reading comprises:

delay means for delaying each said detection signal by a period of time required for the corresponding synchronization mark to arrive at said thermal head assembly of said second recording station; and switch means for alternately switching the memory being read out in response to each detection signal.

* * * * *